United States Patent
Wagner et al.

(10) Patent No.: US 12,013,127 B2
(45) Date of Patent: Jun. 18, 2024

(54) GREASE CATCHER FOR EXHAUST SYSTEM

(71) Applicant: Driploc, Inc., Oklahoma City, OK (US)

(72) Inventors: Barry E Wagner, Oklahoma City, OK (US); Benjamin P. Glenn, Oklahoma City, OK (US)

(73) Assignee: Driploc, Inc., Oklahoma City, OK (US)

( * ) Notice: Subject to any disclaimer, the term of this patent is extended or adjusted under 35 U.S.C. 154(b) by 610 days.

(21) Appl. No.: 17/220,521

(22) Filed: Apr. 1, 2021

(65) Prior Publication Data
US 2022/0316715 A1   Oct. 6, 2022

(51) Int. Cl.
*F24C 15/20* (2006.01)
*B01D 45/06* (2006.01)
*B01D 45/16* (2006.01)

(52) U.S. Cl.
CPC .......... *F24C 15/2035* (2013.01); *B01D 45/06* (2013.01); *B01D 45/16* (2013.01)

(58) Field of Classification Search
CPC ............ B01D 45/06; B01D 45/16; F16B 7/00
USPC ............................................ 126/301; 454/49
See application file for complete search history.

(56) References Cited

U.S. PATENT DOCUMENTS

| | | | |
|---|---|---|---|
| 649,387 A | 5/1900 | Wright | |
| 942,656 A | 12/1909 | Moore | |
| 1,151,397 A | 8/1915 | Robinson | |
| 1,212,475 A | 1/1917 | Gillies | |
| 1,295,680 A | 2/1919 | Benson | |
| 1,481,742 A | 5/1921 | Riley | |
| 2,461,398 A | 5/1947 | Sands | |
| 2,837,203 A | 3/1953 | Reeser | |
| 2,980,008 A * | 4/1961 | Akehurst | E04D 13/1471 454/366 |
| 3,393,497 A * | 7/1968 | Donnelly | F24C 15/20 55/DIG. 36 |
| 3,664,514 A | 5/1972 | Drake | |
| 3,896,595 A | 7/1975 | Anghinetti et al. | |
| 4,125,288 A | 11/1978 | Hunter | |
| 4,323,373 A * | 4/1982 | Fritz | B01D 50/60 261/106 |
| 5,196,040 A * | 3/1993 | Malloy | B01D 46/0002 55/486 |
| 5,292,353 A * | 3/1994 | Kaufman | B01D 47/024 96/337 |
| 5,567,216 A | 10/1996 | Mirza et al. | |

(Continued)

*Primary Examiner* — Avinash A Savani
(74) *Attorney, Agent, or Firm* — Baker Donelson Bearman Caldwell & Berkowitz PC

(57) ABSTRACT

A grease catcher includes lower mounting brackets that are mounted to the exposed end of an exhaust fan duct. A tubular body riser is coupled to the lower mounting brackets that has vertical walls that terminate at a top edge. The lid includes a central portion and downwardly extending sidewalls. The lid is spaced from the top edge of the body riser. An exterior housing is coupled to the body riser. The exterior housing has a floor and exterior walls extending upwardly from the floor. The exterior walls are spaced from the lid. The exterior housing is positioned concentrically about the body riser and the lid sidewalls are positioned concentrically about the body riser and concentrically within the tubular exterior housing to form an undulating airflow channel A removable grease absorber is positioned upon the exterior housing floor.

19 Claims, 6 Drawing Sheets

(56) References Cited

U.S. PATENT DOCUMENTS

| | | | |
|---|---|---|---|
| 5,809,993 A * | 9/1998 | Neitzel | F04D 29/703 126/299 R |
| 5,814,115 A | 9/1998 | Allen et al. | |
| 6,289,555 B1 | 9/2001 | Nguyen et al. | |
| 6,311,367 B1 | 11/2001 | Larsen | |
| 6,468,323 B1 * | 10/2002 | Chwala | F24C 15/20 126/299 R |
| 7,037,359 B1 * | 5/2006 | McCauley | F23J 15/02 454/366 |
| 7,500,655 B1 | 3/2009 | Smith et al. | |
| 8,381,626 B2 | 2/2013 | Marsic et al. | |
| 8,529,669 B2 | 9/2013 | Gaddy | |
| 8,535,128 B2 | 9/2013 | Chwala | |
| 8,806,815 B1 * | 8/2014 | Liu | F24S 25/615 52/173.3 |
| 9,303,887 B1 | 4/2016 | Chwala | |
| 9,435,556 B1 | 9/2016 | Chwala | |
| 9,869,488 B2 | 1/2018 | Glenn et al. | |
| 10,646,814 B2 | 5/2020 | Meacham, II | |
| 2007/0175467 A1 | 8/2007 | Liu | |
| 2018/0209672 A1 * | 7/2018 | Chwala | F24F 7/025 |

* cited by examiner

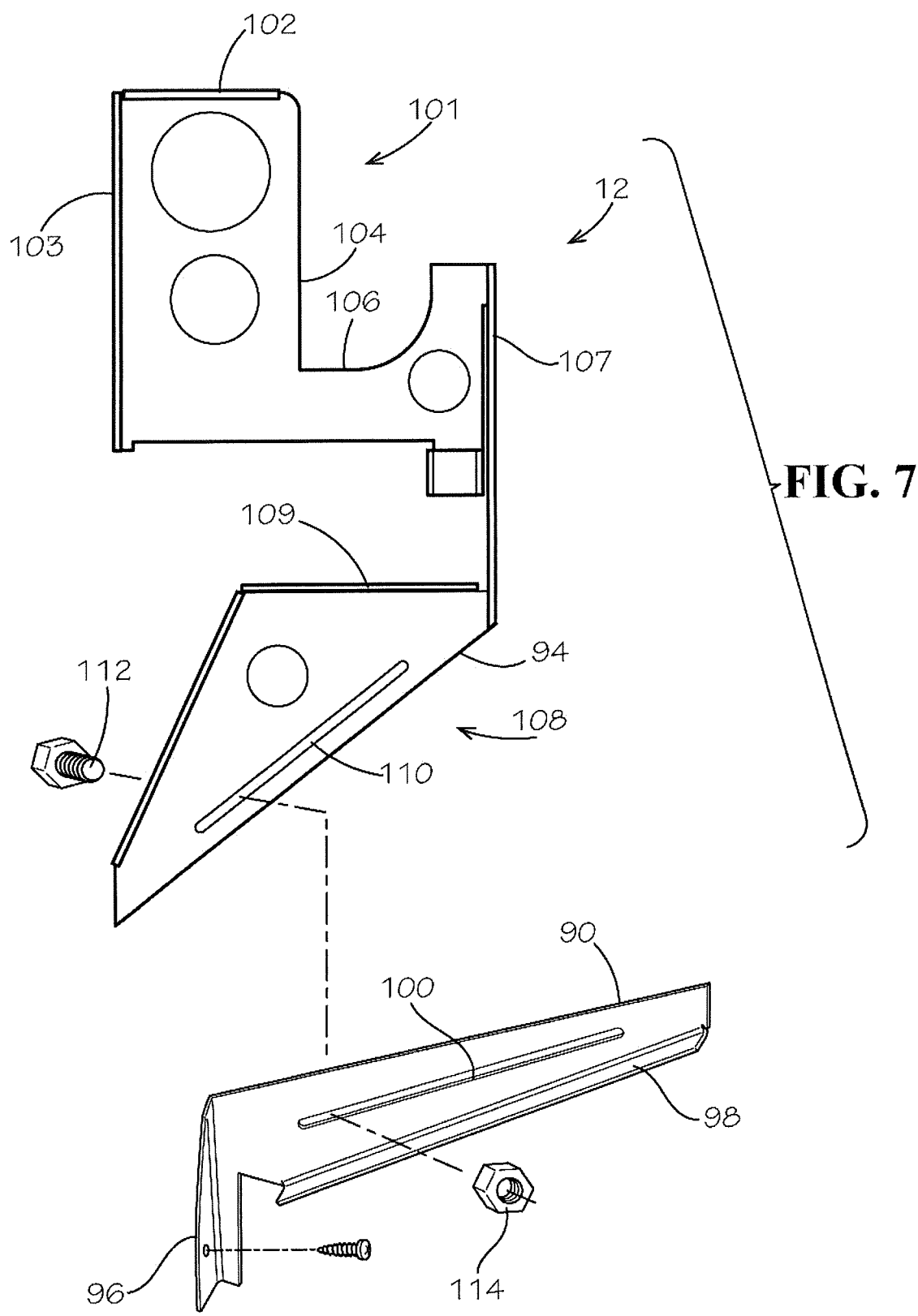

GREASE CATCHER FOR EXHAUST SYSTEM

CROSS REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

FIELD OF THE INVENTION

The invention relates generally to a grease catcher, and more particularly to a grease catcher for a rooftop ventilator.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

In commercial ventilation systems for buildings, exhaust fans are used to expell air from a space and are typically mounted over vents on a roof. For example, a fan-assisted vent at a restaurant permits an exhaust to be withdrawn from the kitchen. Through this vent, grease and other cooking residue are allowed to leave the building. Restaurants, caterers, banquet halls, cafeterias and other places where large quantities of food are prepared use industrial cooking appliances to prepare this food. Above the various cooking appliances is a hood which funnels heat, smoke, steam, grease and other products of the cooking process through an exhaust system which typically extends through the ceiling of the building and vents the products of combustion to the atmosphere on the roof.

A problem associated with such venting of the cooking atmosphere in a commercial cooking environment involves the accumulation of grease in the roof vents and fans of the exhaust system. The grease eventually runs off the vents and fans onto the roof which is typically made of a tar or asphalt based product. The exhausted air may also include grease particles that drop upon the roof. Such grease is detrimental to these roofs as they can promote the decay of the roofing materials. More specifically, the grease degrades and eats away at the tarred roofs and ultimately causes leaking which can lead to other, serious problems.

The accumulation of grease on the roof also creates the addition problem of a slipping hazard for people working in the vicinity of the rooftop vent.

In an effort to minimize the accumulation of grease upon the roof of a structure, grease filters or catchers are typically installed on the exposed end of the exhaust vent duct. These grease catchers typically expell the exhausted air towards a vertical wall, wherein the grease within the airstream is intended to stick to the vertical wall and collect in a collection trough at the bottom of the vertical wall. These systems provide some benefit, however, much of the affluent grease still remains within the airstream that is exhausted in the atmosphere surrounding the grease catcher and onto the surrounding roof.

The damage caused by grease vented to the roof in such commercial cooking environments has long been an expensive, time consuming maintenance problem. The present invention overcomes these problems in the prior art in an inexpensive, efficient and cost effective grease filter for use in commercial cooking exhaust systems employed in commercial food preparation environments such as in restaurants, caterers, banquet halls and cafeterias.

Therefore, there is a need for a grease catcher that removes a greater quantity of the grease within-an-airstream exhausted upon the roof of a building. The grease catcher should be simple to install and use, and it should not require any irreversible modifications of the exhaust vent system.

BRIEF SUMMARY OF THE INVENTION

In a preferred form of the invention, a grease catcher for use with a duct of an exhaust fan comprises lower mounting brackets, a tubular body riser coupled to the lower mounting brackets, a tubular exterior housing positioned concentrically about the body riser, the tubular exterior housing having a floor and at least one exterior wall extending upwardly from the floor, and a lid positioned above the body riser. The lid having a central portion and at least one sidewall extending downwardly from the central portion, at least a portion of the lid sidewall being positioned concentrically between the body riser and the exterior wall of the exterior housing. With this construction, an air channel is formed between the lid and the body riser and between the lid and the exterior housing.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements.

FIG. 7 is a side view of a lower mounting bracket of the grease catcher of FIG. 5.

DETAILED DESCRIPTION OF CERTAIN EMBODIMENTS

Figure 1:
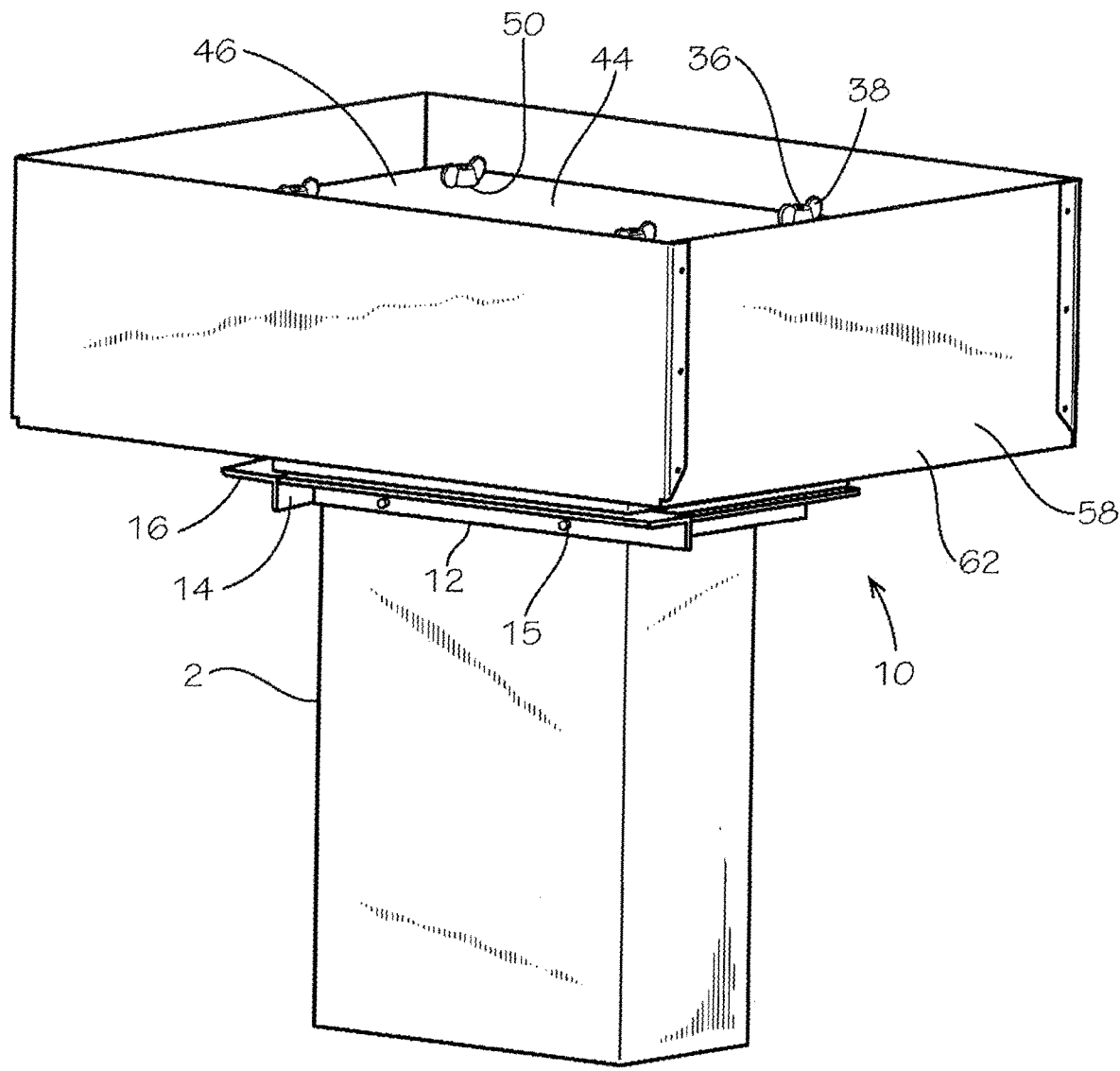
FIG. 1 is a perspective view of the grease catcher embodying principles of the invention in a preferred form, shown mounted to the duct of a conventional roof ventilation system.

With reference next to the drawings, there is shown a grease catcher 10 in a preferred form of the invention. In one form of the invention, the grease catcher 10 is utilized with a conventional roof ventilation system that includes a duct 2 extending from the roof or side of a building.

The grease catcher 10 includes a four, elongated L-shaped lower mounting members or brackets 12 that are mounted to the exposed end of duct 2. The duct 2 in this embodiment is shown in a rectangular shape, thus, the combination of the lower mounting brackets 12 form a corresponding rectangular shape about the duct 2. Each lower mounting bracket 12 has a vertical flange 14 extending to a horizontal flange 16. The lower mounting brackets 12 may be mounted to the duct 2 through mounting screws 15 that threadably pass through the vertical flange 14 of the lower mounting brackets 12 and into the duct 2.

A rectangular shaped, tubular interior housing or body riser 20 is coupled to the lower mounting brackets 12. The body riser 20 includes four vertical walls 22 extending to four outwardly extending riser mounting flanges 24. The four vertical walls 22 terminate at a body riser top end or edge 26. The body riser 20 defines an internal, first space or channel 30.

The body riser 20 is coupled to the lower mounting brackets 12 by mounting screws 32 that threadably pass through the riser mounting flanges 24 and into the lower mounting brackets 12. The body riser 20 also has a four post supports 34 positioned in each of the four interior corners. Four threaded post 36 extend from the four post supports 34. A positioning nut 40 is threaded upon the threaded posts 36 to a desired position of an inverted open box shaped lid 44 that is coupled to the body riser 20 through the four threaded posts 36 to a level resting upon the positioning nuts 40. The threaded posts 36 threadably receive internally threaded wing nuts 38.

The lid 44 includes a rectangular central portion or roof 46 from which four sidewalls 48 downwardly extend to a bottom edge 49. The central portion 46 has four post mounting holes 50 through which extends the four threaded posts 36. The wing nuts 38 are threadably mounted upon the exposed ends of the threaded posts 36 extending past the lid 44 to lock the position of the lid 44 relative to the top edge 26 of the body riser 20. The lid 44 is spaced from the top edge 26 of the body riser 20 so as to define a second space or channel 54 therebetween.

A rectangular exterior housing 58 is coupled to the body riser 20. The exterior housing 58 has a floor 60 and four exterior walls 62 extending upwardly from the floor 60 to define an open top end 64. The exterior walls 62 are spaced from the lid 44 so as to define a third space or channel 66 therebetween. The floor 60 is also spaced from the bottom edge 49 of the lid 44 to further define the third space or channel 66 therebetween. The first channel 30, second channel 54, and third channel 66 co-extend to form one continuous serpentine or undulating airflow channel 68 extending continuously from the duct 2 to ambience beyond the confines of the grease catcher 10, where each channel is angled from the preceding channel to form turns in the overall channel 68.

As such, the tubular exterior housing 58, and specifically the exterior walls 62 of the exterior housing 58, is positioned concentrically about the body riser 20. Similarly, the sidewalls 48 of the lid 44 are positioned concentrically about the body riser 20 and concentrically within the tubular exterior housing 58.

A removable oleophilic substrate, hydrocarbon absorber or filter media 72 is positioned upon the floor 60 of the exterior housing 58 between the exterior housing exterior walls 62 and the body riser vertical walls 22.

All components of the grease catcher 10 may be made of conventionally know materials, such as aluminum, stainless steel, galvanized steel, nickel plated steel, polymers, or the like.

In use, an unshown mechanical blower creates an airflow or airstream AS through the duct 2 that is used to remove grease ladened air from a kitchen environment. Upon the airstream AS reaching the end of the duct 2, the airstream AS passes into the first channel 30 through the body riser 20 until is contacts the central portion 46 of the lid 44. The direction of the airstream AS being straight onto the central portion 46 of the lid causes grease particles to be left upon the central portion 46. The airstream AS is then diverted or transitions into the second channel 54 as the airstream rounds the top edge 26 of the body riser 20. The airstream AS now flows downwardly through the second channel 54 between the body riser 20 and lid sidewalls 48 until it contacts the exterior housing floor 60. Again, the direction of the airstream AS being straight onto the floor 60 causes grease particles to be left upon the floor 60 or the grease absorber 72 thereon. Thus, the airstream AS transitions from the second channel 54 to the third channel 66 between the lid 44 and exterior housing 58. The airstream AS then moves upwardly through the third channel 66 and finally exists the grease catcher 10 through the open top end 64 of the exterior housing 58.

The transition between the upward direction of the airstream AS through the first channel 30 to the downward direction of the second channel 54 causes a slowing or turbulence of the airstream AS that results in grease particles being dropped from the airstream AS. The transition between the downward direction of the second channel 54 to the upward direction of the third channel 66 again causes a slowing or turbulence of the airstream AS that results in additional grease particles being dropped from the airstream AS. Overall, the undulating or serpentine shape of the entire airflow channel 68 creates speed changes and turbulence, or a centrifugal force acting upon the grease particles, within the airstream passing therethrough to cause grease particles to fall from the airstream.

Much of this grease will accumulate upon the walls of the body riser 20, lid 44, and exterior housing 58. The grease particles that accumulates upon the body riser 20 associated with the second channel 54 will drip down the body riser vertical walls 22 and onto the grease absorber 72. The grease particles that accumulates upon the lid 44, and especially the lid sidewalls 48, drip off the bottom edge 49 and onto the grease absorber 72. The grease particles that accumulates upon the interior surface of the exterior walls 62 of the exterior housing 58 drip down the interior surface and onto the grease absorber 72.

After a select period of time, the grease absorber 72 may be removed and replaced with another absorber 72. To do so, the wingnuts 38 are removed from the threaded posts 36 and the lid 44 is lifted and removed. A person may then reach into the grease catcher 10 and remove the spent or saturated grease absorber 72. A fresh grease absorber 72 then then place upon the floor 60 of the exterior housing 58, the lid 44 repositioned, and the wingnuts 38 remounted upon the threaded posts 36. Other components of the grease catcher 10, such as the surfaces of the body riser 20, lid 44 and exterior housing 58 may also be cleaned of grease at this time.

The height of the lid 44 or distance between the lid 44 and the underlying body rise 20 and/or exterior housing 58 may determine the speed at which the airstream AS is exhausted through the grease catcher 10. The height of the lid 44 may be changed by raising or lowering the positioning nut 40 upon the threaded posts 36. The higher the positioning nut 40 is positioned upon the post 36, the more air, or a higher speed of air, passes between the lid 44 and body riser 20 and/or exterior housing 58.

Figure 2:
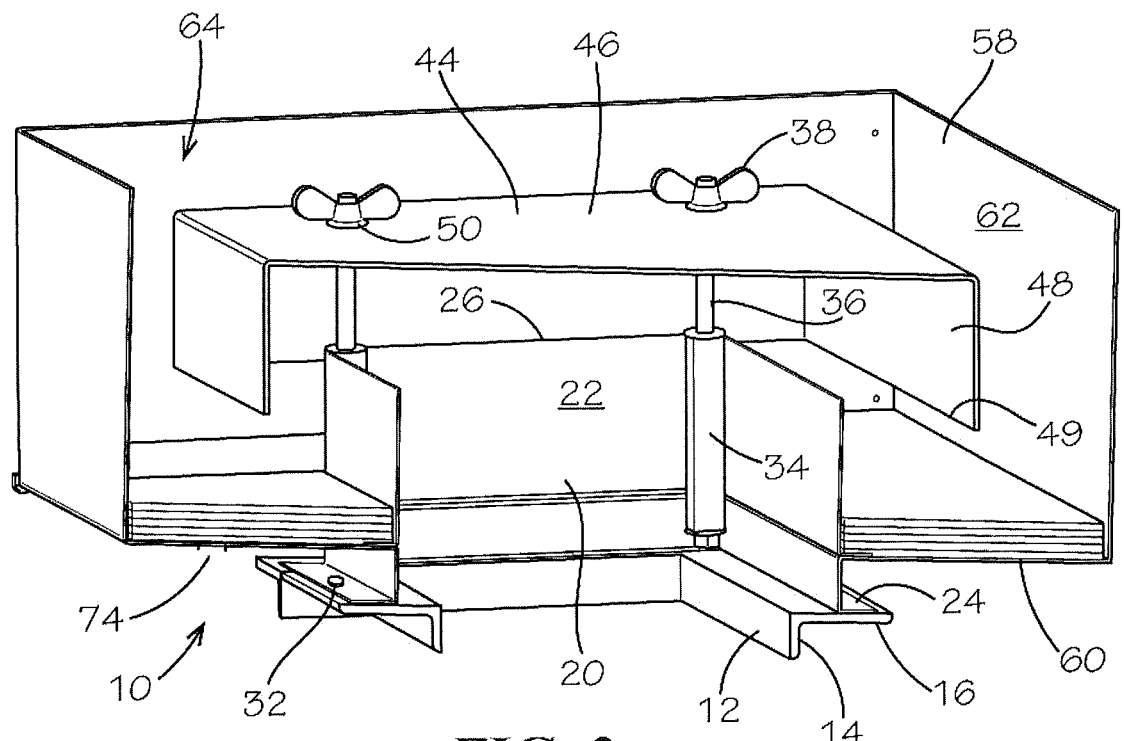
FIG. 2 is a cross-sectional, perspective view of the grease catcher of FIG. 1.
Figure 3:
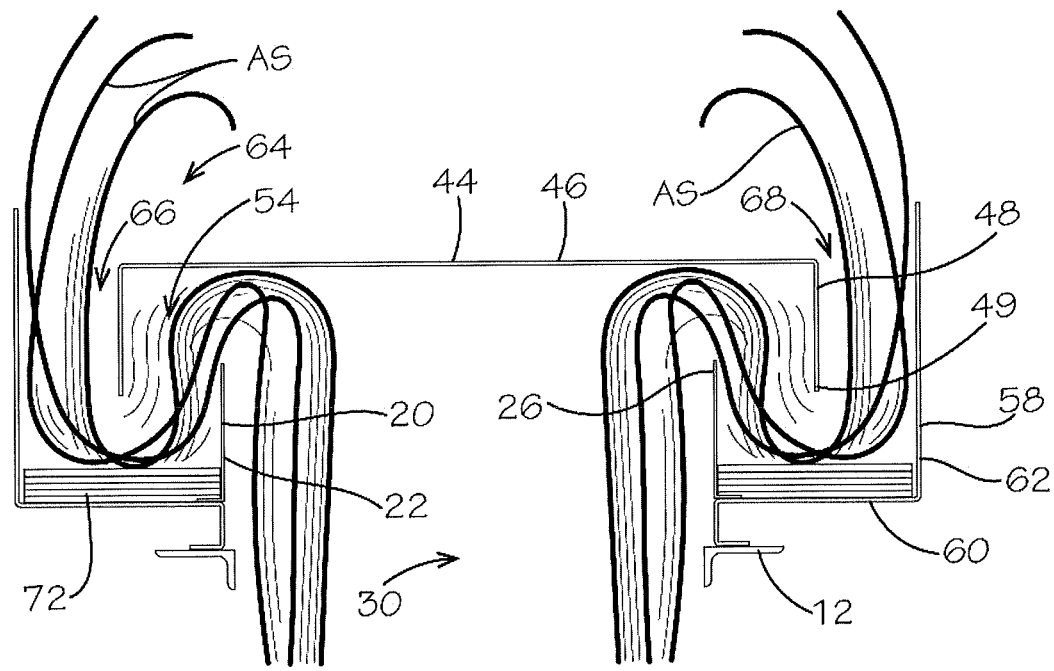
FIG. 3 is a schematic cross-sectional side view of the grease catcher of FIG. 1, showing the airstream movement through the grease catcher.
Figure 4:
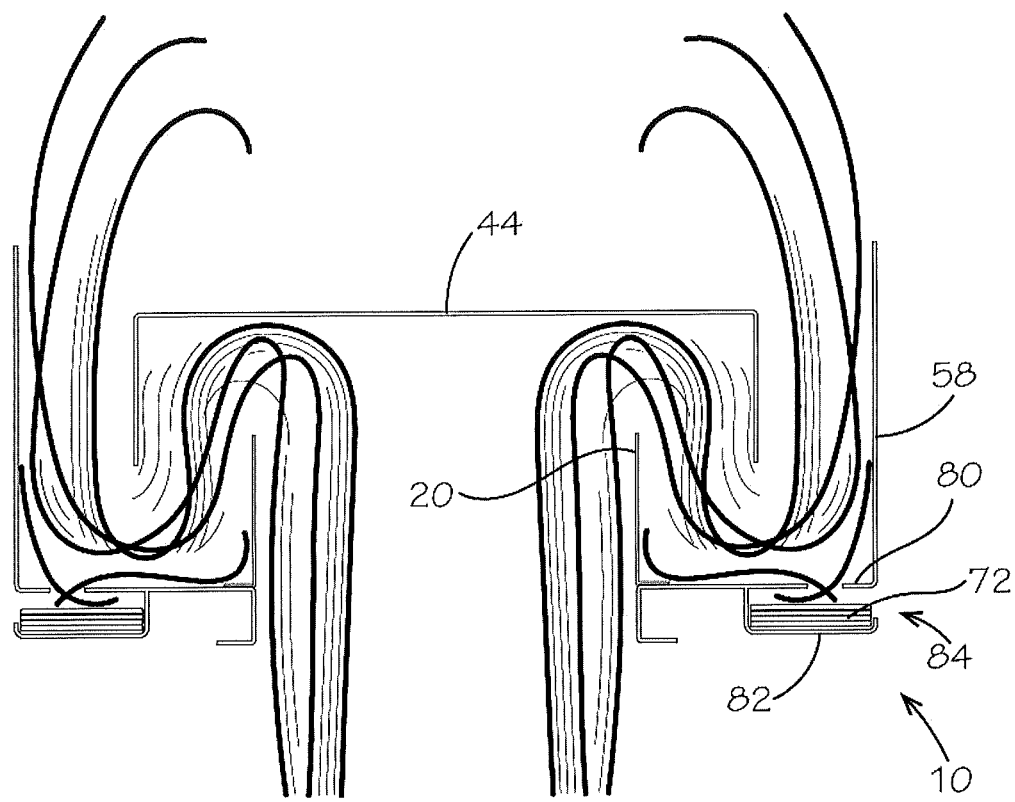
FIG. 4 is a schematic cross-sectional view of a grease catcher in another preferred embodiment, showing the airstream movement through the grease catcher.

With reference next to FIG. 4, there is shown a grease catcher 10 in another preferred form of the invention. Here, the grease catcher 10 is essentially the same as that previously described in reference to FIGS. 1-3, however, the floor 60 of the exterior housing 58 includes an opening 80 in fluid communication with a grease collection trough 82 positioned below the floor 60. The trough 82 may include the filter media 72. The trough 82 may have side openings 84 which allow easy access to and removal of the spent filter media 72.

Figure 6:
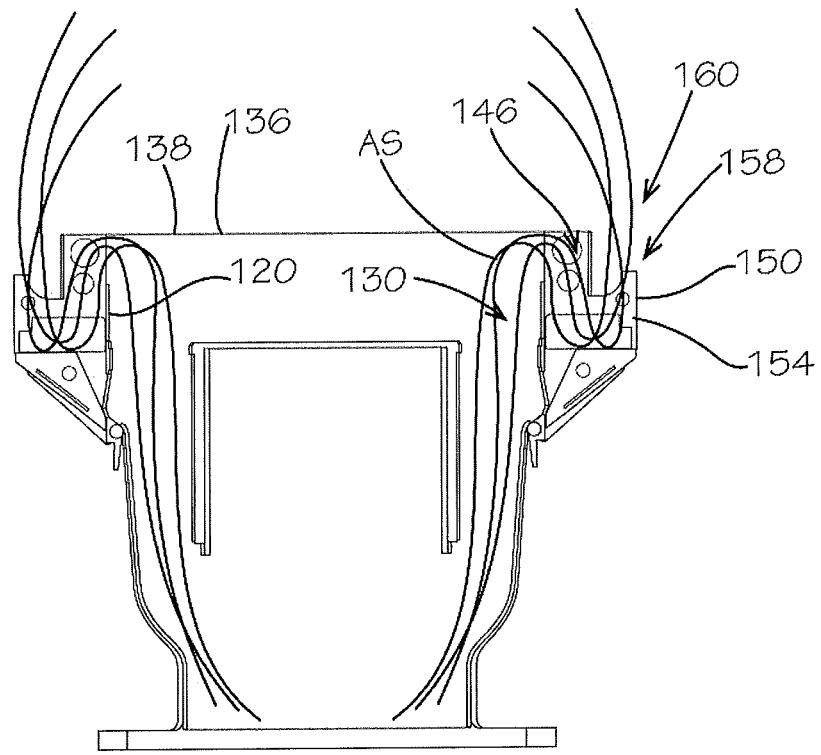
FIG. 6 is a schematic cross-sectional side view of the grease catcher of FIG. 5, showing the airstream movement through the grease catcher.
Figure 5:
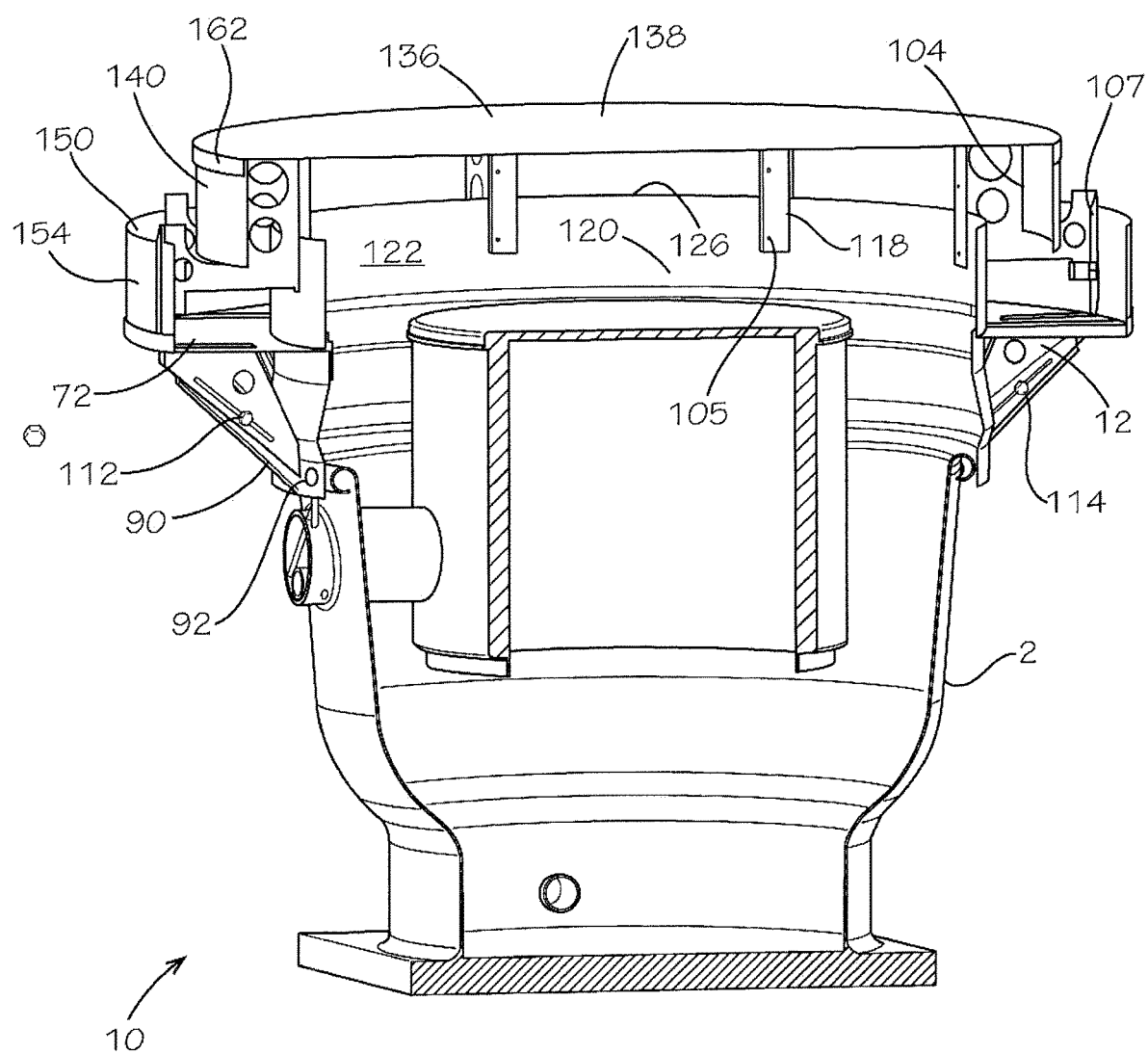
FIG. 5 is a cross-sectional, perspective view of the grease catcher in another preferred embodiment.

With reference next to FIGS. 5-7, there is shown a grease catcher 10 in another preferred form of the invention. Here, the grease catcher 10 is similar to the previously described embodiment of FIGS. 1-3, however, the shape of the grease catcher 10 is round rather than a rectangle. The grease catcher 10 is utilized with a conventional roof ventilation system that includes a duct 2 extending from the roof or side of a building.

The grease catcher 10 includes an annular array of lower mounting brackets 12 that are mounted to the exposed end of duct 2. The duct 2 in this embodiment is shown in a circular or cylindrical shape, thus, the lower mounting brackets 12 are positioned in a corresponding annular shape about the duct 2. Each lower mounting bracket 12 has a lower or buttress flange 90 and a lid positioning flange 94.

Each buttress flange 90 has a mounting portion 96 extending from an arm portion 98. The arm portion 98 has an elongated buttress mounting slot 100. The lower mounting brackets 12 may be mounted to the duct 2 through mounting screws 92 that threadably pass through the buttress flange mounting portion 96 and into the duct 2.

Each lid positioning flange 94 has an upper or top portion 101 with a lid top platform 102 extending to an interior riser mounting wall 103 and a lid side edge 104 that extends to a lid notch 106. The top portion 101 has an exterior housing recess or slot 107. Each lid positioning flange 94 also has a bottom portion 108 with an exterior housing platform 109 and a mounting slot 110. The size and shape of the mounting slot 110 corresponds to or is in register with the mounting buttress slot 100. A threaded mounting bolt 112 and corresponding threaded nut 114 pass through mounting buttress slot 100 and mounting slot 110 to lock the relative positions of the buttress flange 90 and lip positioning flange 94 to each other. With the nut 114 loosened, the top portion 101 is movable along the buttress flange 90 to adjust the width of the lower mounting brackets 12.

An elongated mounting plate 118 is coupled to the riser mounting wall 103 of the top portion 101 through mounting screws 105.

A cylindrical, tubular interior housing or body riser 120 is coupled to the lower mounting brackets 12. The body riser 120 includes a cylindrical vertical wall 122 that terminates at a body riser top end or edge 126. The body riser 120 defines an internal, first space or channel 130.

The body riser 120 is coupled to the lower mounting brackets 12 by mounting screws 132 that threadably pass through the mounting plates 118, through riser body 120, and threaded into riser mounting wall 103 of the top portion 101.

An inverted cylindrical lid 136 is coupled to the lower mounting brackets 12. The lid 136 includes a circular central portion or roof 138 and an annular sidewall 140 that downwardly extends to a bottom edge 142. The lid 136 is spaced from the top edge 126 of the body riser 120 so as to define a second space or channel 146 therebetween. The lid central portion 138 rests upon the lid top platform 102 with the lid bottom edge 142 positioned within the lid notch 106.

A cylindrical exterior housing 150 is coupled to the lower mounting brackets 12. The exterior housing 150 has a floor 152 and an annular exterior wall 154 extending upwardly from the floor 152 to define an open top end 156. The exterior walls 154 are spaced from the lid 136 so as to define a third space or channel 158 therebetween. The floor 152 is also spaced from the bottom edge 142 of the lid 136 to further define the third space or channel 158 therebetween. The first channel 130, second channel 146, and third channel 158 co-extend to form one continuous serpentine or undulating airflow channel 160 extending continuously from the duct 2 to ambience beyond the confines of the grease catcher 10, where each channel is angled from the preceding channel to form turns in the overall channel 160.

As such, the tubular exterior housing 158, and specifically the exterior walls 154 of the exterior housing 158, is positioned concentrically about the body riser 120. Similarly, the sidewalls 140 of the lid 136 are positioned concentrically about the body riser 120 and concentrically within the tubular exterior housing 150.

A removable oleophilic substrate, hydrocarbon absorber or filter media may be positioned upon the floor 152 of the exterior housing 150 between the exterior housing exterior walls 154 and the body riser vertical walls 122.

All components of the grease catcher 10 may be made of conventionally know materials, such as aluminum, stainless steel, galvanized steel, nickel plated steel, polymers, or the like.

In use, an unshown mechanical blower creates an airstream AS through the duct 2 used to remove grease ladened air from a kitchen environment. Upon the airstream AS reaching the end of the duct 2, the airstream AS passes into the first channel 130 through the body riser 120 until it contacts the central portion 138 of the lid 136. The direction of the airstream AS being straight onto the central portion 138 of the lid causes grease particles to be left upon the central portion 138. The airstream AS is then diverted or transitions into the second channel 146 as the airstream rounds the top edge 126 of the body riser 120. The airstream AS now flows downwardly through the second channel 146 between the body riser 120 and lid sidewalls 140 until it contacts the exterior housing floor 152. Again, the direction of the airstream AS being straight onto the floor 152 causes grease particles to be left upon the floor 152 or the grease absorber 72 thereon. Thus, the airstream AS transitions from the second channel 146 to the third channel 158 between the lid 136 and exterior housing 150. The airstream AS then moves upwardly through the third channel 158 and finally exists the grease catcher 10 through the open top end 156 of the exterior housing 150.

The transition between the upward direction of the airstream AS through the first channel 130 to the downward direction of the second channel 146 causes a slowing or turbulence of the airstream AS that results in grease particles being dropped from the airstream AS. The transition between the downward direction of the second channel 146 to the upward direction of the third channel 158 again causes a slowing or turbulence of the airstream AS that results in additional grease particles being dropped from the airstream AS. Overall, the undulating or serpentine shape of the entire airflow channel 160 creates speed changes and turbulence, or a centrifugal force acting upon the grease particles, within the airstream passing therethrough to cause grease particles to fall from the airstream.

Much of this grease will accumulate upon the walls of the body riser 120, lid 136, and exterior housing 150. The grease particles that accumulates upon the body riser 120 associated with the second channel 146 will drip down the body riser vertical walls 122 and onto the floor 152 or grease absorber. The grease particles that accumulates upon the lid 136, and especially the lid sidewalls 140, drip off the bottom edge 142 and onto the floor 152 or grease absorber. The grease particles that accumulates upon the interior surface of the exterior walls 154 of the exterior housing 150 drip down the interior surface and onto the floor 152 or grease absorber.

After a select period of time, the lid 136 may be lifted and removed to replace an absorber with another absorber 72. Other components of the grease catcher 10, such as the surfaces of the body riser 120, lid 136 and exterior housing 150 may also be cleaned of grease at this time.

The height of the lid 136 or distance between the lid 136 and the underlying body rise 120 and/or exterior housing 150 may determine the speed at which the airstream AS is exhausted through the grease catcher 10. The height of the lid 136 may be changed by raising or lowering the lower mounting brackets 12. The higher the lid 136 the more air, or higher the air speed, passes between the lid 136 and body riser 120 and/or exterior housing 150.

Figure 8:
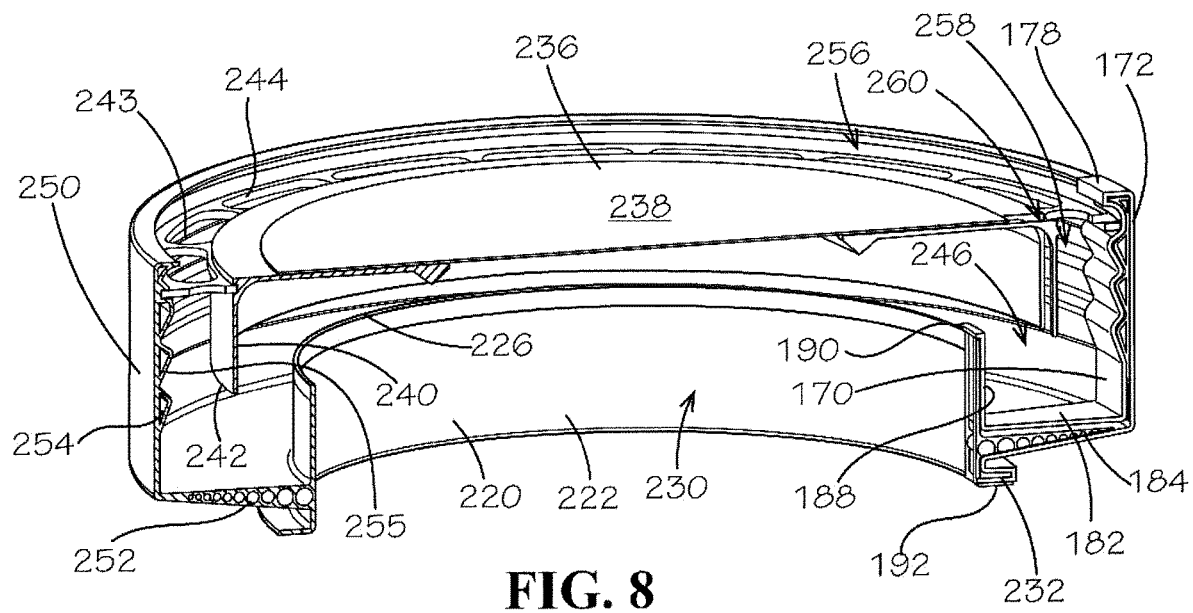
FIG. 8 is a cross-sectional perspective view of a grease catcher in yet another preferred embodiment.
Figure 9:
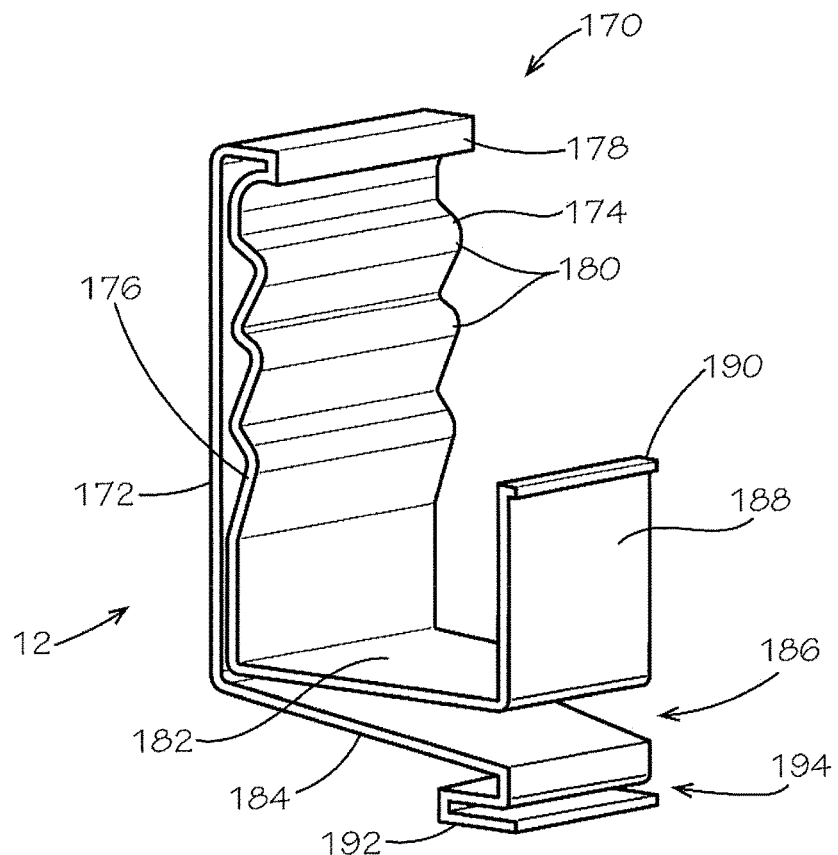
FIG. 9 is a perspective view of a mounting clip of the grease catcher of FIG. 8.

With reference next to FIGS. 8 and 9, there is shown a grease catcher 10 in another preferred form of the invention. Here, the grease catcher 10 is similar to the previously described embodiment of FIGS. 5-7. The grease catcher 10 is utilized with a conventional roof ventilation system that includes a duct 2 extending from the roof or side of a building.

The grease catcher 10 includes an annular array of lower mounting brackets 12 in the form of a mounting clip, as such, the term lower mounting bracket 12 may be referenced as a lower mounting clip 12. The grease catcher 10 is mounted to the exposed end of duct 2. The duct 2 in this embodiment is shown in a circular or cylindrical shape.

Each lower mounting clip 12 has an exterior housing vertical portion 170 having an exterior or outboard wall 172 and an interior or inboard wall 174, defining an exterior housing exterior wall space 176 therebetween. The inboard wall 174 has a top lip 178 and a series of undulations or steps 180. The inboard wall 174 extends to an exterior housing top floor portion or member 182. The outboard wall 172 extends to an exterior housing bottom floor portion or member 184 that generally overlies the top floor member 182. The exterior housing top floor member 182 and the exterior housing bottom floor member 184 define an exterior housing floor space 186 therebetween. A body riser vertical stop wall 188 extends from the exterior housing top floor member 182 oppositely disposed from the inboard wall 174. The body riser vertical stop wall 188 includes a capturing lip 190. A U-shaped body riser capturing flange 192 extends from the exterior housing bottom floor member 184 oppositely from the outboard wall 172. The U-shaped body riser capturing flange 192 defines a body riser flange space 194.

A cylindrical, tubular interior housing or body riser 220 is coupled to the lower mounting brackets 12. The body riser 120 includes a cylindrical vertical wall 222 that terminates at a body riser top end or edge 226. The body riser 220 defines an internal, first space or channel 230. The body riser vertical wall 222 includes an outwardly extending body riser flange 232.

The body riser 220 is coupled to the lower mounting brackets 12 by positioning the body riser flange 232 within the U-shaped body riser capturing flange 192 and extending the capturing tip 190 over the top edge 226 of the body riser 220.

An inverted cylindrical lid 236 is coupled to the lower mounting brackets 12. The lid 236 includes a circular central portion or roof 238 and an annular sidewall 240 that downwardly extends to a bottom edge 242. The lid 236 has an annular mounting ring 243 positioned about the central portion 238. The mounting ring 243 has air passages 244 extending therethrough. The lid 236 is spaced from the top edge 226 of the body riser 220 so as to define a second space or channel 246 therebetween. The lid mounting ring 243 rests upon a selected step 180 of the exterior housing vertical portion 170.

A cylindrical exterior housing 250 is coupled to the lower mounting brackets 12. The exterior housing 250 has a floor 252 and an annular exterior wall 254 extending upwardly from the floor 252 to define an open top end 256. The exterior walls 254 have a series of steps 255 that generally conform to the steps 180 of the interior wall 174. The exterior walls 254 are spaced from the lid 236 so as to define a third space or channel 258 therebetween. The floor 252 is also spaced from the bottom edge 242 of the lid 236 to further define the third space or channel 258 therebetween. The first channel 230, second channel 246, and third channel 258 co-extend to form one continuous serpentine or undulating airflow channel 260 extending continuously from the duct 2 to ambience beyond the confines of the grease catcher 10, where each channel is angled from the preceding channel to form turns in the overall channel 260.

As such, the tubular exterior housing 250, and specifically the exterior walls 254 of the exterior housing 250, is positioned concentrically about the body riser 220. Similarly, the sidewalls 240 of the lid 236 are positioned concentrically about the body riser 220 and concentrically within the tubular exterior housing 250.

A removable oleophilic substrate, hydrocarbon absorber or filter media may be positioned upon the floor 252 of the exterior housing 250 between the exterior housing exterior walls 254 and the body riser vertical walls 222.

All components of the grease catcher 10 may be made of conventionally know materials, such as aluminum, stainless steel, galvanized steel, nickel plated steel, polymers, or the like.

In use, the exterior housing 250 is coupled to the lower mounting brackets 12 by positioning the exterior housing exterior wall 254 within the exterior housing space 176 of the exterior housing vertical portion 170 and the exterior housing floor 252 within the floor space 186, thus capturing the exterior housing 250 within the lower mounting brackets 12. The lower mounting brackets 12 are then fitted to the body riser 220 by positioning the body riser flange 232 within the body riser flange space 194 and the capturing lip 190 over the top edge 226 of the body riser vertical wall 222, thereby capturing the body riser 220. The lid 236 is then mounted to the lower mounting brackets 12 by positioning the lid mounting ring 243 upon a select level of steps 180 of the inboard wall 174 of the exterior housing vertical portion 170.

An unshown mechanical blower creates an airstream AS through the duct 2 used to remove grease ladened air from a kitchen environment. Upon the airstream AS reaching the end of the duct 2, the airstream AS passes into the first channel 230 through the body riser 220 until it contacts the central portion 238 of the lid 236. The direction of the airstream AS being straight onto the central portion 236 of the lid causes grease particles to be left upon the central portion 236. The airstream AS is then diverted or transitions into the second channel 246 as the airstream rounds the top edge 226 of the body riser 220. The airstream AS now flows downwardly through the second channel 246 between the body riser 220 and lid sidewalls 240 until it contacts the exterior housing floor 252. Again, the direction of the airstream AS being straight onto the floor 252 causes grease particles to be left upon the floor 252 or the grease absorber 72 thereon. Thus, the airstream AS transitions from the second channel 246 to the third channel 258 between the lid 236 and exterior housing 250. The airstream AS then moves upwardly through the third channel 258 and finally exists the grease catcher 10 through the open top end 256 of the exterior housing 250.

The transition between the upward direction of the airstream AS through the first channel 230 to the downward direction of the second channel 246 causes a slowing or turbulence of the airstream AS that results in grease particles being dropped from the airstream AS. The transition between the downward direction of the second channel 246 to the upward direction of the third channel 258 again causes a slowing or turbulence of the airstream AS that results in additional grease particles being dropped from the airstream AS. Overall, the undulating or serpentine shape of the entire airflow channel 260 creates speed changes and turbulence, or a centrifugal force acting upon the grease particles, within the airstream passing therethrough to cause grease particles to fall from the airstream.

Much of this grease will accumulate upon the walls of the body riser 220, lid 236, and exterior housing 250. The grease particles that accumulates upon the body riser 220 associated with the second channel 246 will drip down the body riser vertical walls 222 and onto the floor 252 or grease absorber. The grease particles that accumulates upon the lid 236, and especially the lid sidewalls 240, drip off the bottom edge 242 and onto the floor 252 or grease absorber. The grease particles that accumulates upon the interior surface of the exterior walls 254 of the exterior housing 250 drip down the interior surface and onto the floor 252 or grease absorber.

After a select period of time, the lid 236 may be lifted and removed to replace an absorber with another absorber. Other components of the grease catcher 10, such as the surfaces of the body riser 220, lid 236 and exterior housing 250 may also be cleaned of grease at this time.

The height of the lid 236 or distance between the lid 236 and the underlying body rise 220 and/or exterior housing 250 may determine the speed at which the airstream AS is exhausted through the grease catcher 10. The height of the lid 236 may be changed by raising or lowering the lid 236 through the selection of the step 180 of the exterior housing vertical portion 170 upon which the lid mounting ring 243 rests upon. The higher the lid 236 the more air passes through the mounting ring air passages 244 between the lid 236 and body riser 220 and/or exterior housing 250.

It should be understood that the exterior housing floor may include drain holes 74 to allow the passage of rainwater accumulating within the exterior housing.

It should also be understood that the lid 136 may have ridged sidewalls 140 and a flexible central portion 138 which is stretched over the top of the sidewalls 140 and held in place through a flexible and adjustable banding ring 162 which sandwiches the central portion 138 between the sidewalls 140 and the banding ring 162.

It will be understood that each of the elements described above, or two or more together may also find a useful application in other types of methods differing from the type described above. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims. The foregoing embodiments are presented by way of example only; the scope of the present invention is to be limited only by the following claims.

The invention claimed is:

1. A grease catcher for use with a duct of an exhaust fan, said grease catcher comprising:
    lower mounting brackets;
    a tubular body riser coupled to said lower mounting brackets;
    a tubular exterior housing positioned concentrically about said body riser, said tubular exterior housing having a floor and at least one exterior wall extending upwardly from said floor, and
    a lid positioned above said body riser, said lid having a central portion and at least one sidewall extending downwardly from said central portion, at least a portion of said lid sidewall being positioned concentrically between said body riser and said exterior wall of said exterior housing,
    wherein the position of said lid above said riser body is adjustable,
    whereby an air channel is formed between the lid and the body riser and between the lid and the exterior housing.

2. The grease catcher of claim 1 further comprising a grease absorber positioned upon said floor of said tubular exterior housing.

3. The grease catcher of claim 1 wherein said exterior housing includes a grease collection trough mounted beneath said floor of said exterior housing, and wherein said floor of said exterior housing has opening therethrough in fluid communication with said grease collection trough.

4. The grease catcher of claim 1 wherein said lower mounting brackets comprises elongated L-shaped members.

5. A grease catcher for use with a duct of an exhaust fan, said grease catcher comprising:
    lower mounting brackets;
    a tubular body riser coupled to said lower mounting brackets;
    a tubular exterior housing positioned concentrically about said body riser, said tubular exterior housing having a floor and at least one exterior wall extending upwardly from said floor, and
    a lid positioned above said body riser, said lid having a central portion and at least one sidewall extending downwardly from said central portion, at least a portion of said lid sidewall being positioned concentrically between said body riser and said exterior wall of said exterior housing, wherein said lower mounting brackets include a lid top platform upon which rests said lid, and an exterior housing platform upon which rests said exterior housing, whereby an air channel is formed between the lid and the body riser and between the lid and the exterior housing.

6. A grease catcher for use with a duct of an exhaust fan, said grease catcher comprising:

lower mounting brackets;

a tubular body riser coupled to said lower mounting brackets;

a tubular exterior housing positioned concentrically about said body riser, said tubular exterior housing having a floor and at least one exterior wall extending upwardly from said floor, and a lid positioned above said body riser, said lid having a central portion and at least one sidewall extending downwardly from said central portion, at least a portion of said lid sidewall being positioned concentrically between said body riser and said exterior wall of said exterior housing, wherein said lower mounting brackets include a lid notch that receives a lower edge portion of said sidewall of said lid, whereby an air channel is formed between the lid and the body riser and between the lid and the exterior housing.

7. A grease catcher for use with a duct of an exhaust fan, said grease catcher comprising:

lower mounting brackets;

a tubular body riser coupled to said lower mounting brackets;

a tubular exterior housing positioned concentrically about said body riser, said tubular exterior housing having a floor and at least one exterior wall extending upwardly from said floor, and a lid positioned above said body riser, said lid having a central portion and at least one sidewall extending downwardly from said central portion, at least a portion of said lid sidewall being positioned concentrically between said body riser and said exterior wall of said exterior housing, wherein said lower mounting brackets include a lower flange and an upper flange adjustably coupled to said lower flange to vary the width of said lower mounting brackets, whereby an air channel is formed between the lid and the body riser and between the lid and the exterior housing.

8. A grease catcher for use with a duct of an exhaust fan, said grease catcher comprising:

lower mounting brackets;

a tubular body riser coupled to said lower mounting brackets;

a tubular exterior housing positioned concentrically about said body riser, said tubular exterior housing having a floor and at least one exterior wall extending upwardly from said floor, and a lid positioned above said body riser, said lid having a central portion and at least one sidewall extending downwardly from said central portion, at least a portion of said lid sidewall being positioned concentrically between said body riser and said exterior wall of said exterior housing, wherein said lower mounting brackets have a first portion capturing a portion of said exterior housing, and a second portion capturing a portion of said riser body, whereby an air channel is formed between the lid and the body riser and between the lid and the exterior housing.

9. The grease catcher of claim 8 wherein said lower mounting brackets have a plurality of steps, and wherein said lid is configured to engage a select said step of said plurality of steps to establish a height of said lid above said riser body.

10. A grease catcher for use with a duct of an exhaust fan, said grease catcher comprising:

a plurality of lower mounting brackets;

an interior housing coupled to said lower mounting brackets, said interior housing defining a first airflow channel therein;

a lid having a central portion and a lid sidewall extending from said central portion, at least a portion of said lid sidewall being positioned about and spaced from said interior housing to form a second airflow channel therebetween, said second airflow channel being in fluid communication with said first airflow channel, an exterior housing having a floor and an exterior wall extending from said floor, said exterior housing being positioned about and spaced from said lid sidewall to form a third airflow channel therebetween, said third airflow channel being in fluid communication with said second airflow channel, and wherein the position of said lid above said interior housing is adjustable.

11. The grease catcher of claim 10 wherein said first airflow channel directs the airflow in a first direction, wherein said second airflow channel directs the airflow in a second direction angled from said first direction, and wherein said third airflow channel directs the airflow in a third direction angled from said second direction.

12. The grease catcher of claim 11 wherein said first airflow channel is oriented vertically, wherein said second airflow channel is oriented horizontally, and wherein said third airflow chancel is oriented vertically.

13. The grease catcher of claim 10 further comprising a grease absorber positioned upon said floor of said exterior housing.

14. The grease catcher of claim 10 wherein said exterior housing includes a grease collection trough mounted beneath said floor of said exterior housing, and wherein said floor of said exterior housing has opening therethrough in fluid communication with said grease collection trough.

15. A grease catcher for use with a duct of an exhaust fan, said grease catcher comprising:

a plurality of lower mounting brackets;

an interior housing coupled to said lower mounting brackets, said interior housing defining a first airflow channel therein;

a lid having a central portion and a lid sidewall extending from said central portion, at least a portion of said lid sidewall being positioned about and spaced from said interior housing to form a second airflow channel therebetween, said second airflow channel being in fluid communication with said first airflow channel, an exterior housing having a floor and an exterior wall extending from said floor, said exterior housing being positioned about and spaced from said lid sidewall to form a third airflow channel therebetween, said third airflow channel being in fluid communication with said second airflow channel, and wherein each said lower mounting bracket includes a lid top platform upon which rests said lid, and an exterior housing platform upon which rests said exterior housing.

16. A grease catcher for use with a duct of an exhaust fan, said grease catcher comprising:

a plurality of lower mounting brackets;

an interior housing coupled to said lower mounting brackets, said interior housing defining a first airflow channel therein;

a lid having a central portion and a lid sidewall extending from said central portion, at least a portion of said lid sidewall being positioned about and spaced from said interior housing to form a second airflow channel therebetween, said second airflow channel being in fluid communication with said first airflow channel, an exterior housing having a floor and an exterior wall extending from said floor, said exterior housing being positioned about and spaced from said lid sidewall to form a third airflow channel therebetween, said third airflow channel being in fluid communication with said second airflow channel, and wherein each said lower mounting bracket includes a lid notch that receives a lower edge portion of said lid sidewall.

17. A grease catcher for use with a duct of an exhaust fan, said grease catcher comprising:

a plurality of lower mounting brackets;

an interior housing coupled to said lower mounting brackets, said interior housing defining a first airflow channel therein;

a lid having a central portion and a lid sidewall extending from said central portion, at least a portion of said lid sidewall being positioned about and spaced from said interior housing to form a second airflow channel therebetween, said second airflow channel being in fluid communication with said first airflow channel, an exterior housing having a floor and an exterior wall extending from said floor, said exterior housing being positioned about and spaced from said lid sidewall to form a third airflow channel therebetween, said third airflow channel being in fluid communication with said second airflow channel, and wherein each said lower mounting bracket includes a lower flange and an upper flange adjustably coupled to said lower flange to vary the width of said lower mounting brackets.

18. A grease catcher for use with a duct of an exhaust fan, said grease catcher comprising:

a plurality of lower mounting brackets;

an interior housing coupled to said lower mounting brackets, said interior housing defining a first airflow channel therein;

a lid having a central portion and a lid sidewall extending from said central portion, at least a portion of said lid sidewall being positioned about and spaced from said interior housing to form a second airflow channel therebetween, said second airflow channel being in fluid communication with said first airflow channel, an exterior housing having a floor and an exterior wall extending from said floor, said exterior housing being positioned about and spaced from said lid sidewall to form a third airflow channel therebetween, said third airflow channel being in fluid communication with said second airflow channel, and wherein each said lower mounting bracket have a first portion capturing a portion of said exterior housing, and a second portion capturing a portion of said interior housing.

19. The grease catcher of claim 18 wherein each said lower mounting bracket has a plurality of steps, and wherein said lid is configured to engage a select said step of said plurality of steps to establish a height of said lid above said interior housing.

\* \* \* \* \*